(12) United States Patent
Zhou

(10) Patent No.: US 10,917,397 B2
(45) Date of Patent: *Feb. 9, 2021

(54) ESTABLISHING A TRUSTED LOGIN PROCEDURE

(71) Applicant: Advanced New Technologies Co., Ltd., George Town (KY)

(72) Inventor: Zhizhang Zhou, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/884,966

(22) Filed: May 27, 2020

(65) Prior Publication Data

US 2020/0287886 A1 Sep. 10, 2020

Related U.S. Application Data

(63) Continuation of application No. 15/809,780, filed on Nov. 10, 2017, now Pat. No. 10,673,834, which is a
(Continued)

(30) Foreign Application Priority Data

May 12, 2015 (CN) .......................... 2015 1 0239796

(51) Int. Cl.
*H04L 29/06* (2006.01)
*H04L 9/32* (2006.01)
*G06Q 20/38* (2012.01)

(52) U.S. Cl.
CPC ........ *H04L 63/0815* (2013.01); *H04L 9/3239* (2013.01); *H04L 29/06* (2013.01); *H04L 63/0876* (2013.01); *G06Q 20/382* (2013.01)

(58) Field of Classification Search
CPC ............ H04L 63/0815; H04L 63/0876; H04L 9/3239; H04L 29/06; H04L 67/02; H04L 63/10; H04L 63/0853; G06Q 20/382
(Continued)

(56) References Cited

U.S. PATENT DOCUMENTS 7,437,457 B1 * 10/2008 Eisendrath .............. H04L 63/10
709/204
8,073,928 B2 * 12/2011 Dolin ..................... G06Q 30/02
709/217
(Continued)

FOREIGN PATENT DOCUMENTS

CN 102299936 12/2011
CN 102622270 8/2012
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Badri Narayanan
(74) *Attorney, Agent, or Firm* — Fish & Richardson P.C.

(57) ABSTRACT

A first login request for the first service is received at a first server that provides a first service and from a terminal. Device identifier information of the terminal is generated by a hardware processor at the first server. The device identifier information of the terminal is associated, by the hardware processor at the first server, with first login state information. The first login state information indicates that the terminal has logged into the first server. The device identifier information and the first login state information are transmitted to a second server. The second server provides a second service that has a trusted login relationship with the first service.

15 Claims, 9 Drawing Sheets

Related U.S. Application Data continuation of application No. PCT/CN2016/079555, filed on Apr. 18, 2016.

(58) Field of Classification Search
USPC .............................................................. 726/8
See application file for complete search history.

(56) References Cited

U.S. PATENT DOCUMENTS

| | | | | |
|---|---|---|---|---|
| 8,112,789 | B2* | 2/2012 | Halls | H04L 63/0815 726/4 |
| 8,176,327 | B2* | 5/2012 | Xiong | H04L 9/3271 713/176 |
| 8,931,061 | B2* | 1/2015 | Sundaram | G06F 21/00 726/4 |
| 8,949,596 | B2* | 2/2015 | Yin | H04L 63/108 713/155 |
| 9,397,989 | B1* | 7/2016 | Ramalingam | H04L 63/08 |
| 10,313,264 | B2* | 6/2019 | Whalley | H04L 47/803 |
| 10,362,020 | B2* | 7/2019 | Zhou | H04L 9/3268 |
| 2003/0233329 | A1* | 12/2003 | Laraki | H04L 29/12009 705/52 |
| 2008/0215600 | A1* | 9/2008 | Kudo | G06F 9/451 |
| 2009/0300744 | A1* | 12/2009 | Guo | H04L 63/0823 726/7 |
| 2013/0086669 | A1* | 4/2013 | Sondhi | H04W 12/0608 726/8 |
| 2014/0082715 | A1* | 3/2014 | Grajek | G06F 16/955 726/8 |
| 2014/0123232 | A1* | 5/2014 | Kuscher | H04L 63/0876 726/4 |
| 2014/0250511 | A1* | 9/2014 | Kendall | H04W 12/0027 726/6 |
| 2015/0341353 | A1* | 11/2015 | Zhou | H04L 9/3268 713/175 |
| 2018/0097801 | A1 | 4/2018 | Zhou | |

FOREIGN PATENT DOCUMENTS

| | | |
|---|---|---|
| CN | 103188207 | 7/2013 |
| CN | 103188237 | 7/2013 |
| CN | 104268457 | 1/2015 |
| CN | 104348777 | 2/2015 |
| CN | 104580074 | 4/2015 |
| JP | 2002335239 | 11/2002 |
| JP | 2013250612 | 12/2013 |
| JP | 2013257806 | 12/2013 |
| KR | 20040066394 | 7/2004 |
| WO | WO 2014046880 | 3/2014 |
| WO | WO 2015010558 | 1/2015 |

OTHER PUBLICATIONS

European Extended Search Report in European Application No. 16792021.4, dated Oct. 9, 2018, 9 pages.

International Search Report of the International Searching Authority issued in International Application No. PCT/CN2016/079555 dated Jul. 4, 2016; 8 pages.

Nakamoto, "Bitcoin: A Peer-to-Peer Electronic Cash System," www.bitcoin.org, 2005, 9 pages.

Search Report and Written Opinion by the Intellectual Property Office of Singapore issued in Singapore Application No. 11201708989Q dated Jul. 12, 2018; 7 pages.

\* cited by examiner

ESTABLISHING A TRUSTED LOGIN PROCEDURE

CROSS REFERENCE TO RELATED APPLICATIONS

This application is a continuation of and claims the benefit of U.S. patent application Ser. No. 15/809,780, filed Nov. 10, 2017, which is a continuation of PCT Application No. PCT/CN2016/079555, filed on Apr. 18, 2016, which claims priority to Chinese Patent Application No. 201510239796.0, filed on May 12, 2015, and each application is incorporated by reference in its entirety.

TECHNICAL FIELD

The present application relates to the field of computer technologies and, in particular, to establishing a trusted login procedure.

BACKGROUND

A trusted login procedure can also be referred to as an auto login procedure between two services. In one example, a user can log into a website of the first service to perform an online transaction. The login can be performed using security credentials such as a username, a password, or a combination thereof. To complete the online transaction, the user may be redirected to a website of a second service to process the online transaction. In some cases, the user can complete the processing without using the security credentials again. In other words, the website of the second service can be configured to trust a user who has already logged into the website of the first service for the online transaction. Examples of the website of the first service can include an online shopping website, a website providing organized activities, and a website providing personal or enterprise services. Examples of the websites of the second service can include a payment website that is used to enter payment information to complete the online shopping and a registration website that is used to register for a specific activity.

SUMMARY

The present disclosure describes establishing a trusted login procedure.

In an implementation, a computer-implemented method for a trusted login procedure includes: receiving, at a first server that provides a first service and from a terminal, a first login request for the first service; generating, by a hardware processor at the first server, device identifier information of the terminal; associating, by the hardware processor at the first server, the device identifier information of the terminal with first login state information, wherein the first login state information indicates that the terminal has logged into the first server; and transmitting, to a second server, the device identifier information and the first login state information, wherein the second server provides a second service that has a trusted login relationship with the first service.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to realize one or more of the following advantages. For example, by using a back-end synchronization procedure, a second server can prevent different terminals from using a trusted login procedure to access the second server and therefore improve security of the trusted login procedure. Additionally, the second server can query a first server to update the current login state of a terminal for the first server, and therefore prevent a terminal from having an expired login state with the first server upon using the trusted login procedure to access the second server.

The details of one or more implementations of the subject matter of this specification are set forth in the Detailed Description, the Claims, and the accompanying drawings. Other features, aspects, and advantages of the subject matter will become apparent from the Detailed Description, the Claims, and the accompanying drawings.

DESCRIPTION OF DRAWINGS

Like reference numbers and designations in the various drawings indicate like elements.

DETAILED DESCRIPTION

Figure 1:
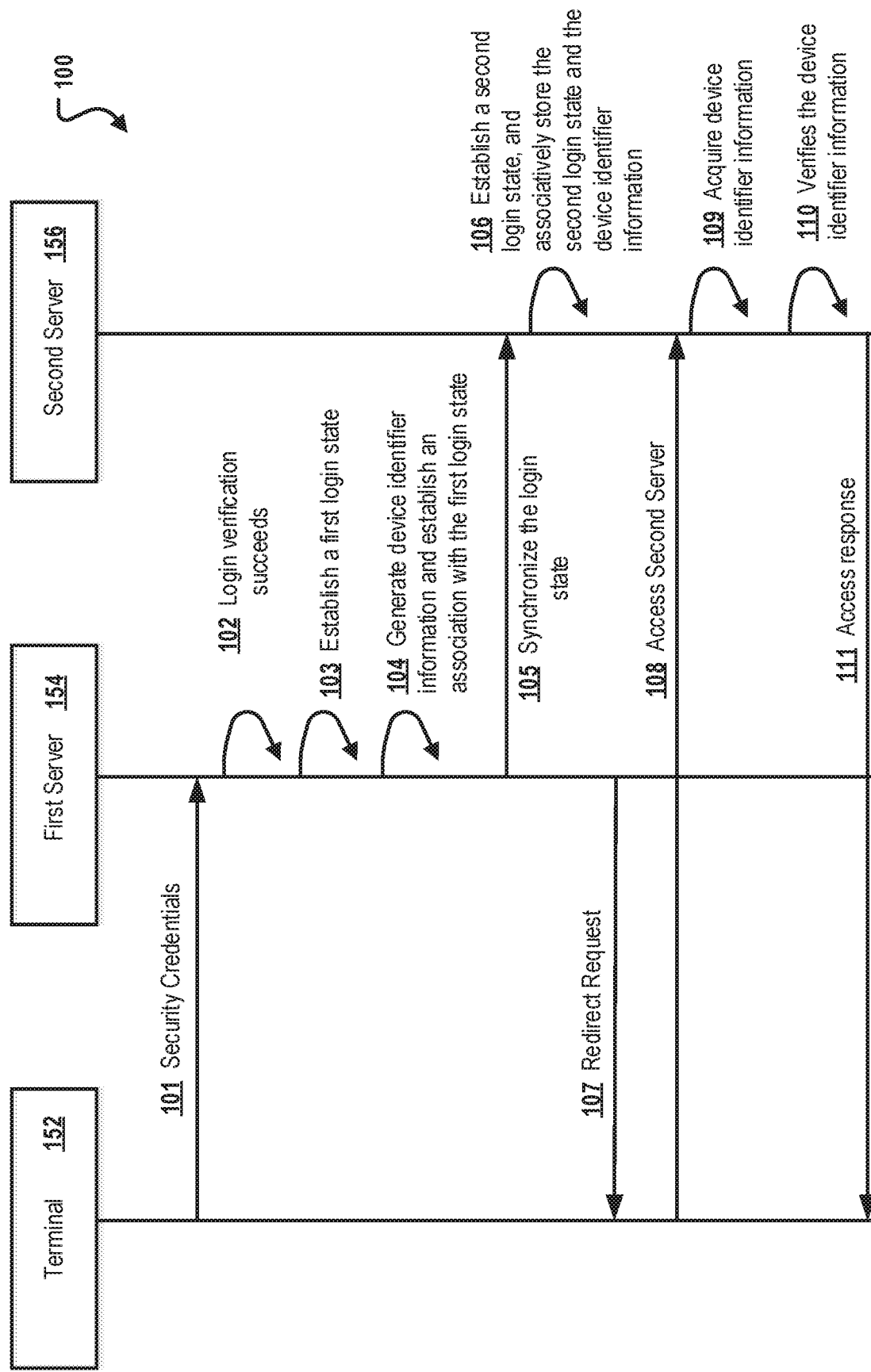
FIG. 1 illustrates an example of a trusted login method, according to an implementation of the present disclosure.

The following detailed description describes establishing a trusted login procedure, and is presented to enable any person skilled in the art to make and use the disclosed subject matter in the context of one or more particular implementations. Various modifications, alterations, and permutations of the disclosed implementations can be made and will be readily apparent to those or ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

The trusted login procedure is an auto login procedure that facilitates seamless switching of a user between different services. For example, after a user logs into a server A that provides a first service, the user also has an access right to a server B that provides a second service because the server B trusts the user that has successfully logged into the server A. In some cases, users of server A and server B that perform the trusted login procedure can be the same user, for example, the user registers with server A and server B by using the same account. Alternatively or additionally, users of the two servers can have a binding relation. For example, users register with the two servers by using different accounts that are associated/mapped with each other.

In some implementations, a trusted login procedure can be performed as follows: after a user logs into a first server for a first service, a digital signature of the first server is sent to the user. The digital signature is added to a website link address of a second service. The address carrying the digital signature can be referred to as a trusted login website address. The user can use the trusted login website address, for example by clicking the trusted login website address or posting the trusted login website address in an address field of a browser, to access a second server for a second service. The second server can check the digital signature included in the trusted login website address, and determine that the user has successfully logged into the first server. Therefore, the second server can accept the user as already logged in, without requesting for additional security credentials for login.

However, this approach may have security risks. For example, the trusted login website address can be copied between devices. Therefore, the trusted login website address can be used by an unsecure device to access the second server, and cause security breaches at the second server. Furthermore, the trusted login relationship between the user and the first server may expire, but the second server would not be able to detect such an expiration by examining the trusted login website address.

In some implementations, instead of using a front-end indicator, such as the digital signature included in the trusted login website address, the first server and the second server can synchronize the login states for a particular terminal using back-end signaling exchanges. The first server and the second server can associate device identifier information with the login state for each server and exchange the login states and the device identifier information with each other. Therefore, the second server can determine that a terminal has logged into the first server and grant access to the terminal in a trusted login procedure, while preventing a different terminal from using the trusted login procedure. Furthermore, the second server can query the first server to determine whether the login state for the first server is still valid. FIGS. 1-7 and associated descriptions provide additional details of these implementations.

FIG. 1 illustrates an example of a trusted login method 100, according to an implementation of the present disclosure. For clarity of presentation, the description that follows generally describes method 100 in the context of the other figures in this description. As illustrated, method 100 is performed by a terminal 152, a first server 154, and a second server 156. However, it will be understood that method 100 can be performed, for example, by any system, environment, software, and hardware, or a combination of systems, environments, software, and hardware, as appropriate. In some implementations, various steps of method 100 can be run in parallel, in combination, in loops, or in any order.

At 101, security credentials are transmitted from the terminal 152 to the first server 154. The terminal 152 can be a computing device that is used by an end user to access online services. For example, the terminal 152 can include a browser or an app that can send access requests to the first server 154 or the second server 156. The security credentials can be a username or an account name, a password, or any other security information that can be used to log into the first server 154. The first server 154 can be a server that provides online service for the first service. For example, the first server 154 can host a website for online shopping. In one example, a user can direct the browser on the terminal 152 to the first server 154. The first server 154 can request the user to enter security credentials to log into the first server 154. The user can enter the security credentials into the browser. The terminal 152 can receive the security credentials and send the security credentials to the first server 154.

At 102, the first server 154 verifies the security credentials and determines that the verification is successful. From 102, method 100 proceeds to 103.

At 103, the first server 154 establishes a first login state. The first login state indicates that the user has logged into the first server 154 from the terminal 152 using valid security credentials. The first server 154 can record the first login state information for the first login state. The first login state information can include an indicator indicating that the user has logged into the first server 154. The first login state information can also include user information, including for example account name or username, login duration, an environment of the terminal 152, including, for example, browser version, terminal model, terminal internal protocol (IP) address, terminal media access control (MAC) address, terminal subscriber identity module (SIM) card number or Universal Integrated Circuit Card (UICC) number, and the like. From 103, method 100 proceeds to 104.

At 104, the first server 154 generates device identifier information of the terminal 162, and establishes an association relation between the device identifier information and the first login state information. The device identifier information can identify the terminal 152 on which the user logs into the first server 154. The device identifier information can be information of the terminal 152 that is obtained by the first server 154, for example, by the login request at 101 or any other information exchanges between the first server 154 and the terminal 152. The information of the terminal 152 can include for example, the terminal 152's terminal internal protocol (IP) address, terminal media access control (MAC) address, terminal subscriber identity module (SIM) card number or Universal Integrated Circuit Card (UICC) number, or any combinations thereof. The device identifier information can also be calculated by the first server 154 based on the information of the terminal 152 discussed previously. For example, the device identifier information can be calculated by using an MD5 algorithm based on the terminal 152's IP address, MAC address, SIM card number of the UICC number. Different terminal devices generally have different address information and MAC information, and therefore, the calculated device identifier information is generally different for different devices and can be used to identify a login device. From 104, method 100 proceeds to 105.

At 105, the first server 154 sends the device identifier information and the first login state information to the second server 156 to synchronize the login states between the two servers. The second server 156 can be a server that provides online services for the second service that is associated with the first service. For example, the second service can be a backend processing service for the first service. In one example, the first server 154 can host a website for online shopping services and the second server 156 can host a website for payment services for the online shopping services.

By sending the device identifier information and the first login state information to the second server 156 during the login state synchronization method 105, the first server 154 notifies the second server 156 that the user has already logged into the first server 154. In some implementations, the first login state information that is transmitted to the second server 156 can be part or all of the first login state information that has been recorded by the first server 154. For example, the first login state information sent to the second server 156 can include an indicator that indicates the user having logged into the first server 154. Additionally, the first login state information sent to the second server 156 can also include information of the terminal 152, as discussed previously.

In some cases, the first server 154 can also associate an identifier of the second server 156 with the first login state after the synchronization procedure is completed. Thus the first server 154 can record that the first login state information has been shared with the second server 156.

In some cases, the synchronization step 105 can be triggered by redirecting operations between the first server 154 and the second server 156. In one example, after the user completes the initial selection process for the online shopping as the user is ready for payment, the first server 154 can redirect the user to the second server 156 for completing the payment service. This redirecting operation can trigger the first server 154 to send the device identifier information and the first login state information to the second server for synchronization. From 105, method 100 proceeds to 106.

At 106, the second server 156 establishes a second login state of the user for the second service based on the first login state. The second server 156 can record the second login state information for the second login state. The second login state information can include an indicator indicating that the user has logged into the second server 156. The second login state information can also include the device identifier information received from the first server 154. The second server 156 can associate the second login state information with the device identifier information received from the first server 154. From 106, method 100 proceeds to 107.

At 107, the first server 154 sends a redirect request to the terminal 152 to redirect the terminal 152 to the second server 156. The redirect request can include a link address of the second server 156, for example, a Uniform Resource Locator (URL) of the payment website hosted by the second server 156. In this method, the link address does not include a digital signature that facilitates the trusted login procedure. From 108, method 100 proceeds to 108.

At 108, the terminal 152 accesses the second server 156. In some cases, the access can be triggered by a user clicking on the link address received at 107. From 108, method 100 proceeds to 109.

At 109, the second server 156 acquires the device identifier information of the terminal 152. The second server 156 can acquire the terminal information of the terminal 152 from the access request at 108 or any other information exchanges between the second server 156 and the terminal 152. Similarly to that discussed previously with respect to the first server 154, the acquired device identifier information can include the terminal information of the terminal 152, calculated information that is calculated based on the terminal information of the terminal 152, or a combination thereof. In some implementations, the second server 156 uses the same algorithm as the first server 154 in calculating the device identifier information. From 109, method 100 proceeds to 110.

At 110, the second server 156 verifies that the acquired device identifier information matches the stored device identifier information associated with the second login state. If the two device identifier information matches, the second server 156 can verify that the access request is sent by the same terminal that has logged into the first server 154. The second server 156 acquires the corresponding second login state information. From 110, method 100 proceeds to 111.

At 111, the second server 156 sends an access response to the terminal 152, indicating that the trusted login procedure has succeeded and the user has logged into the second server 156. If the two device identifier information does not match, the second server 156 can send an access response indicating that the trusted login procedure has failed. In some cases, the user can log into the second server 156 by re-entering security credentials.

In this operation, if a user has changed a terminal and copied the digital signature of the first server 154 in order to attempt to log into the second server 156, the trusted login procedure would fail. Therefore, the security of the online server is improved.

Figure 2:
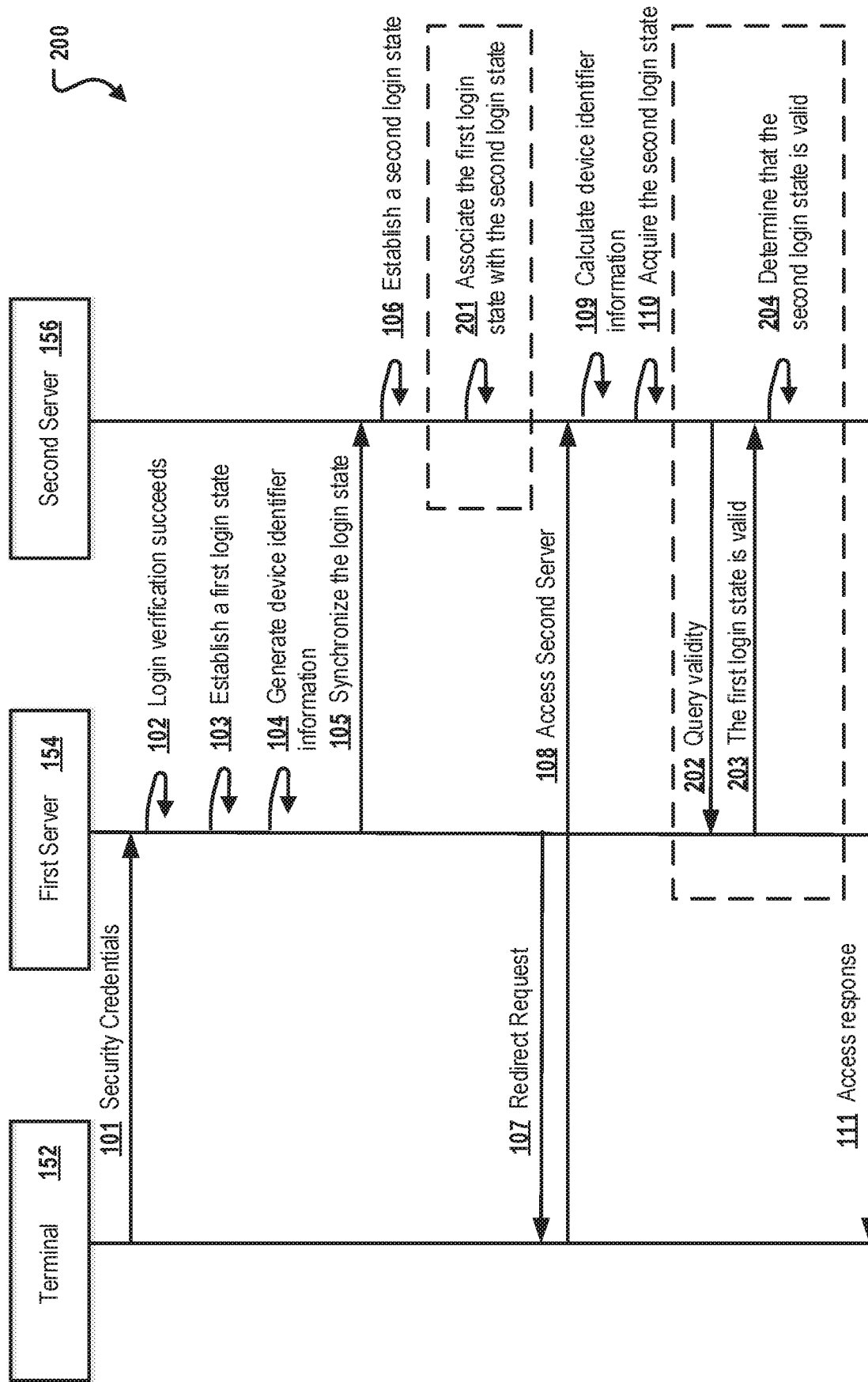
FIG. 2 illustrates another example of a trusted login method, according to an implementation of the present disclosure.

In some cases, the first login state at the first server 154 may expire. For example, the first server 154 may set a validity period after the user has logged into the first server 154 from the terminal 152. After the validity period expires, the user is no longer logged in and may need to re-enter security credentials to log in. In these or other cases, the second server 156 can query the first server 154 about the status of the first login state. FIG. 2 and associated descriptions include additional details of these implementation. After 111, method 100 stops FIG. 2 illustrates another example of a trusted login method 200, according to an implementation of the present disclosure. For clarity of presentation, the description that follows generally describes method 200 in the context of the other figures in this description. As illustrated, method 200 is performed by the terminal 152, the first server 154, and the second server 156. However, it will be understood that method 200 can be performed, for example, by any system, environment, software, and hardware, or a combination of systems, environments, software, and hardware, as appropriate. In some implementations, various steps of method 200 can be run in parallel, in combination, in loops, or in any order.

Steps 101-106 in method 200 are similar to that of method 100. After 106, method 200 proceeds to 201, which is performed by the second server 156.

At 201, the second server 156 associates the first login state information with the second login state information. In one example, the two login state information corresponds to the device identifier information of the terminal 152, and therefore the two login state information can be associated with each other based on the same device identifier information. In another example, the first server 154 can generate a login state identifier (ID) and send the login state ID at 105. In some cases, the login state ID can be generated randomly.

The second server 156 can associate both the first login state information and the second login state information with the received login state ID.

Steps 107-110 in method 200 are similar to those of method 100. After 110, 202-204 are performed.

At 202, the second server 156 can send a query to the first server 154 to query the validity of the first login state at the first server 154. The query can include the device identifier information, the login state ID, or any other information that can be used by the first server 154 to search the first login state information of the terminal 152. From 202, method 200 proceeds to 203.

At 203, the first server 154 determines whether the first login state is still valid and sends a response to the second server 156. In some cases, if the first login state has expired, the first server 154 can delete the first login state information, or change the indicator in the first login state information to indicate that the user is no longer logged in. In some implementations, the first server 154 can set a valid period for the first login state, for example, 30 minutes. If the valid period has lapsed, the first server 154 can determine that the first login state has expired. In these cases, the first server 154 can determine that the first login state is no longer valid and send the response indicating that the terminal 152 is no longer logged into the first server 154. Otherwise, the first server can verify that the first login state is valid and send the response indicating that the terminal 152 is still logged into the first server 154. From 203, method 200 proceeds to 204.

At 204, the second server 156 can determine that the second login state is valid based on the response received at 203. If the response indicates that the first login state is valid, the second server 156 can determine that the second login state is also valid. If the response indicates that the first login state is no longer valid, the second server 156 can determine that the second login state is also not valid. From 204, method 200 proceeds to 111.

At 111, the second server 156 can send a response. After 111, method 200 stops.

Figure 3:
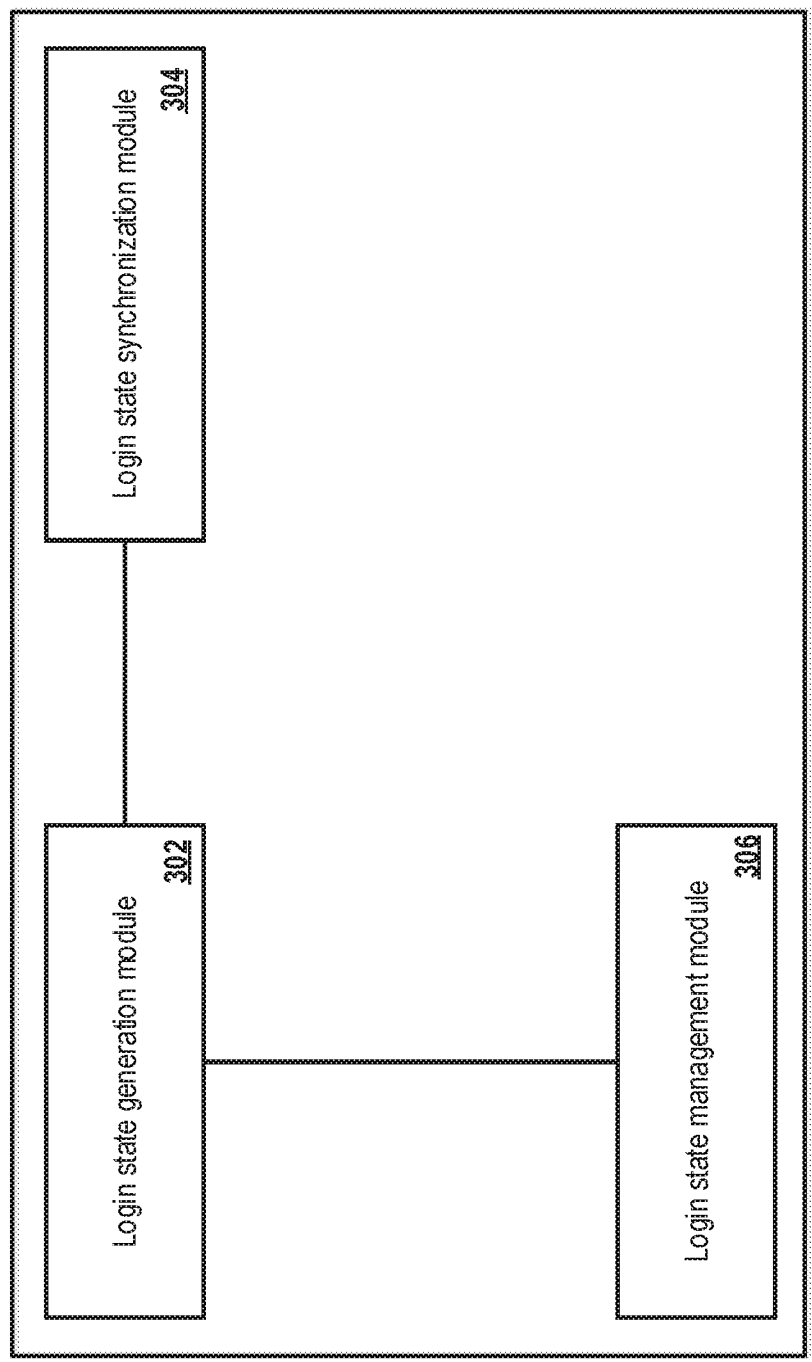
FIG. 3 is a schematic diagram illustrating an example of a computing device that records a first login state, according to an implementation of the present disclosure.

FIG. 3 is a schematic diagram illustrating an example of a computing device 300 that records a first login state, according to an implementation of the present disclosure. For example, the device 300 can be used to implement the server for the first service, for example the first server 154. The device 300 includes a login state generation module 302, a login state synchronization module 304, and a login state management module 306.

The login state generation module 302 is configured to acquire device identifier information of a user login terminal after a user logs into the device 300 using the user login terminal. The login state generation module 302 is also configured to associate the device identifier information with the first login state information.

The login state synchronization module 304 is configured to send the device identifier information and the first login state information to a server of a second service. The second service is a trusted login service associated with the first service.

The login state management module 306 is configured to receive a validity query request, determine whether a first login state is still valid, and send a response to indicate whether the first login state is still valid. In some cases, device 300 can be implemented without the login state management module 306.

Figure 4:
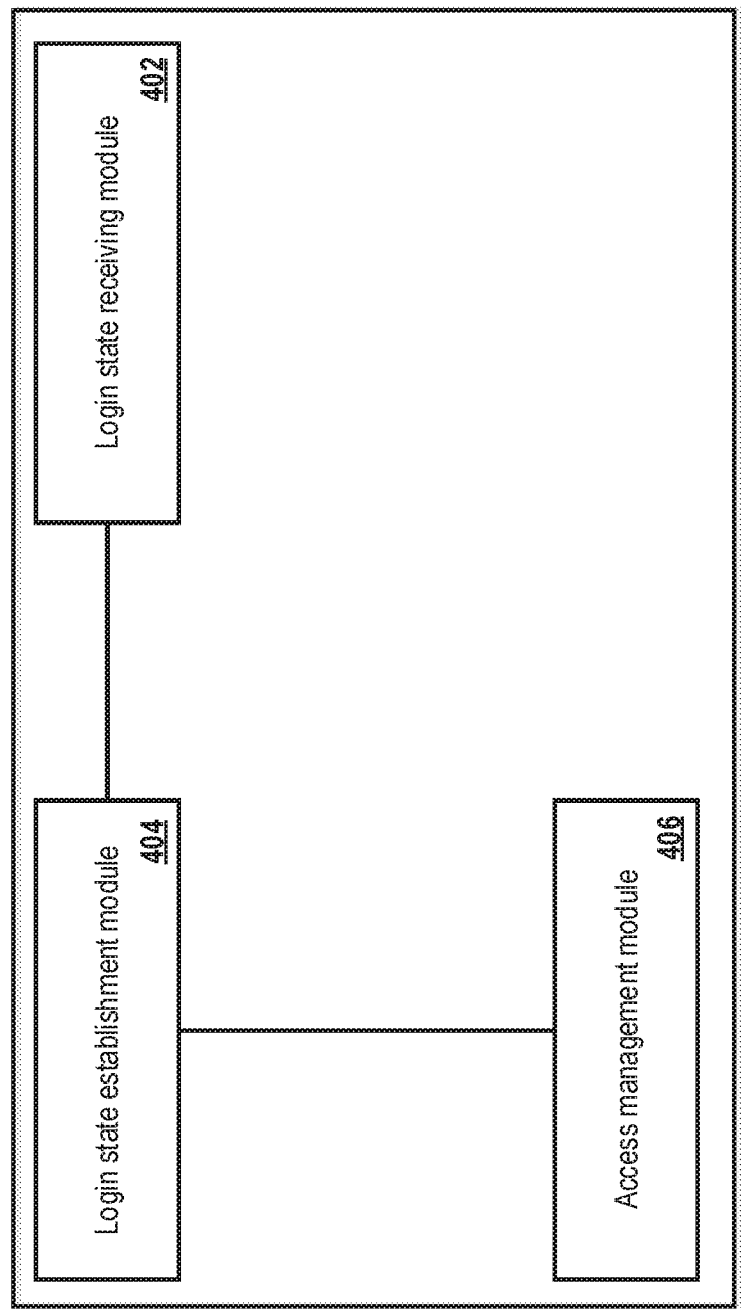
FIG. 4 is a schematic diagram illustrating an example of a computing device that determines a second login state, according to an implementation of the present disclosure.

FIG. 4 is a schematic diagram illustrating an example of a computing device 400 that determines a second login state, according to an implementation of the present disclosure. For example, the device 400 can be used to implement the server for the second service, for example the second server 156. The device 400 includes a login state receiving module 402, a login state establishment module 404, and an access management module 406.

The login state receiving module 402 is configured to receive a first login state information and device identifier information sent by a server of a first service, the first service being a trusted login application associated with a second service, the first login state information indicating that a user logs into the first service, and the device identifier information representing a login device on which the user logs into the first service.

The login state establishment module 404 is configured to establish a second login state of the user in the second service according to the first login state, and associate and store the device identifier information and the second login state. The login state establishment module 404 is further configured to establish a corresponding relation between the first login state and the second login state after establishing the second login state of the user in the second service.

The access management module 406 is configured to, upon receipt of an access request for the second service, return an access response indicating whether the user is logged into the device 400 based on a trusted login procedure. The access management module 406 is further configured to, after determining that the identifier information of the device sending the access request and the corresponding second login state have been stored, and before returning the access response, send a validity query request for the first login state to the server of the first service, and determine that the first login state and the second login state are valid.

Figure 5:
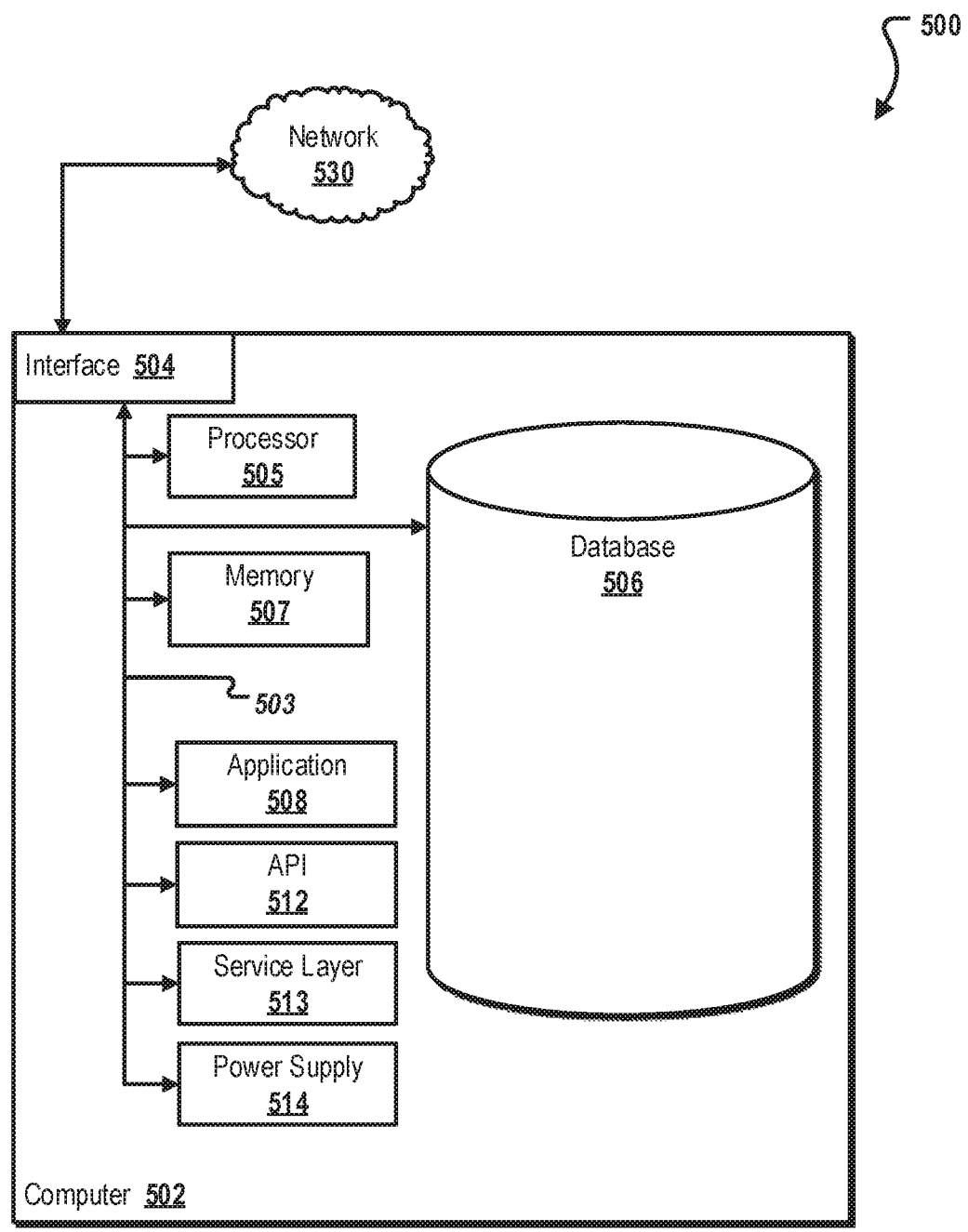
FIG. 5 is a block diagram illustrating an example of a computer system used to provide computational functionalities associated with described algorithms, methods, functions, processes, flows, and procedures, according to an implementation of the present disclosure.

FIG. 5 is a block diagram illustrating an example of a computer system 500 used to provide computational functionalities associated with described algorithms, methods, functions, processes, flows, and procedures, according to an implementation of the present disclosure. The illustrated computer 502 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 502 can comprise a computer that includes an input device, such as a keypad, keyboard, touch screen, another input device, or a combination of input devices that can accept user information, and an output device that conveys information associated with the operation of the computer 502, including digital data, visual, audio, another type of information, or a combination of types of information, on a graphical-type user interface (UI) (or GUI) or other UI. The computer 502 can be used to implement the computing device that provides a user interface for a user to log into a server, for example, the terminal 152 discussed previously. The computer 502 can also be used to implement a server that provides services to the user, for example, the first server 154 and the second server 156 discussed previously.

The computer 502 can serve in a role in a computer system as a client, network component, a server, a database or another persistency, another role, or a combination of roles for performing the subject matter described in the present disclosure. The illustrated computer 502 is communicably coupled with a network 530. In some implementations, one or more components of the computer 502 can be configured to operate within an environment, including cloud-computing-based, local, global, another environment, or a combination of environments.

At a high level, the computer 502 is an electronic computing device operable to receive, transmit, process, store, or manage data and information associated with the described subject matter. According to some implementations, the computer 502 can also include or be communicably coupled with a server, including an application server, e-mail server, web server, caching server, streaming data server, another server, or a combination of servers.

The computer 502 can receive requests over network 530 (for example, from a client software application executing on another computer 502) and respond to the received requests by processing the received requests using a software application or a combination of software applications. In addition, requests can also be sent to the computer 502 from internal users (for example, from a command console or by another internal access method), external or third-parties, or other entities, individuals, systems, or computers.

Each of the components of the computer 502 can communicate using a system bus 503. In some implementations, any or all of the components of the computer 502, including hardware, software, or a combination of hardware and software, can interface over the system bus 503 using an application programming interface (API) 512, a service layer 513, or a combination of the API 512 and service layer 513. The API 512 can include specifications for routines, data structures, and object classes. The API 512 can be either computer-language independent or dependent and refer to a complete interface, a single function, or even a set of APIs. The service layer 513 provides software services to the computer 502 or other components (whether illustrated or not) that are communicably coupled to the computer 502. The functionality of the computer 502 can be accessible for all service consumers using this service layer. Software services, such as those provided by the service layer 513, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 502, alternative implementations can illustrate the API 512 or the service layer 513 as stand-alone components in relation to other components of the computer 502 or other components (whether illustrated or not) that are communicably coupled to the computer 502. Moreover, any or all parts of the API 512 or the service layer 513 can be implemented as a child or a sub-module of another software module, enterprise application, or hardware module without departing from the scope of the present disclosure.

The computer 502 includes an interface 504. Although illustrated as a single interface 504 in FIG. 5, two or more interfaces 504 can be used according to particular needs, desires, or particular implementations of the computer 502. The interface 504 is used by the computer 502 for communicating with another computing system (whether illustrated or not) that is communicatively linked to the network 530 in a distributed environment. Generally, the interface 504 is operable to communicate with the network 530 and comprises logic encoded in software, hardware, or a combination of software and hardware. More specifically, the interface 504 can comprise software supporting one or more communication protocols associated with communications such that the network 530 or interface's hardware is operable to communicate physical signals within and outside of the illustrated computer 502.

The computer 502 includes a processor 505. Although illustrated as a single processor 505 in FIG. 5, two or more processors can be used according to particular needs, desires, or particular implementations of the computer 502. Generally, the processor 505 executes instructions and manipulates data to perform the operations of the computer 502 and any algorithms, methods, functions, processes, flows, and procedures as described in the present disclosure.

The computer 502 also includes a database 506 that can hold data for the computer 502, another component communicatively linked to the network 530 (whether illustrated or not), or a combination of the computer 502 and another component. For example, database 506 can be an in-memory, conventional, or another type of database storing data consistent with the present disclosure. In some implementations, database 506 can be a combination of two or more different database types (for example, a hybrid in-memory and conventional database) according to particular needs, desires, or particular implementations of the computer 502 and the described functionality. Although illustrated as a single database 506 in FIG. 5, two or more databases of similar or differing types can be used according to particular needs, desires, or particular implementations of the computer 502 and the described functionality. While database 506 is illustrated as an integral component of the computer 502, in alternative implementations, database 506 can be external to the computer 502.

The computer 502 also includes a memory 507 that can hold data for the computer 502, another component or components communicatively linked to the network 530 (whether illustrated or not), or a combination of the computer 502 and another component. Memory 507 can store any data consistent with the present disclosure. In some implementations, memory 507 can be a combination of two or more different types of memory (for example, a combination of semiconductor and magnetic storage) according to particular needs, desires, or particular implementations of the computer 502 and the described functionality. Although illustrated as a single memory 507 in FIG. 5, two or more memories 507 or similar or differing types can be used according to particular needs, desires, or particular implementations of the computer 502 and the described functionality. While memory 507 is illustrated as an integral component of the computer 502, in alternative implementations, memory 507 can be external to the computer 502.

The application 508 is an algorithmic software engine providing functionality according to particular needs, desires, or particular implementations of the computer 502, particularly with respect to functionality described in the present disclosure. For example, application 508 can serve as one or more components, modules, or applications. Further, although illustrated as a single application 508, the application 508 can be implemented as multiple applications 508 on the computer 502. In addition, although illustrated as integral to the computer 502, in alternative implementations, the application 508 can be external to the computer 502.

The computer 502 can also include a power supply 514. The power supply 514 can include a rechargeable or non-rechargeable battery that can be configured to be either user- or non-user-replaceable. In some implementations, the power supply 514 can include power-conversion or management circuits (including recharging, standby, or another power management functionality). In some implementations, the power-supply 514 can include a power plug to allow the computer 502 to be plugged into a wall socket or another power source to, for example, power the computer 502 or recharge a rechargeable battery.

There can be any number of computers 502 associated with, or external to, a computer system containing computer 502, each computer 502 communicating over network 530. Further, the term "client," "user," or other appropriate terminology can be used interchangeably, as appropriate, without departing from the scope of the present disclosure. Moreover, the present disclosure contemplates that many users can use one computer 502, or that one user can use multiple computers 502.

Figure 6A:
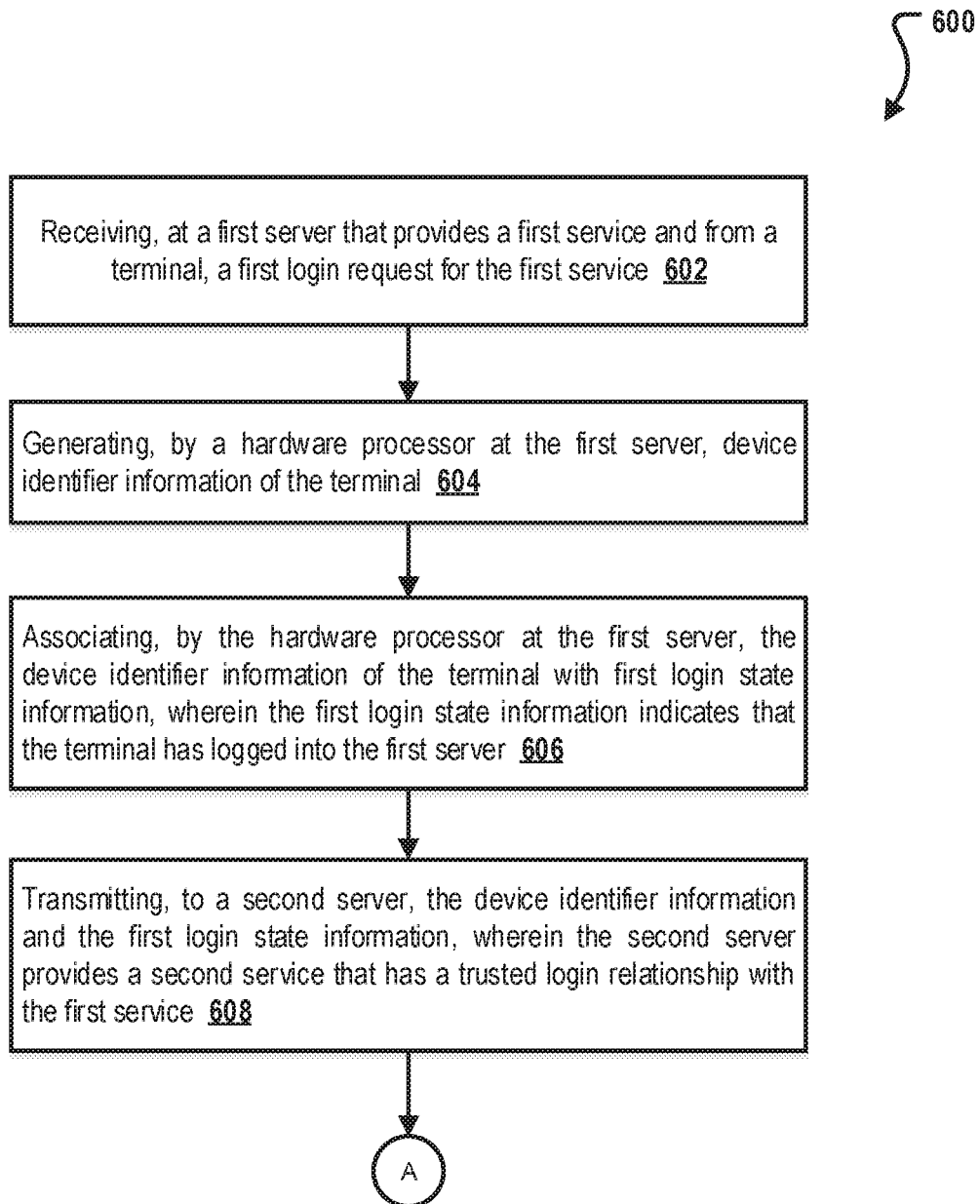
FIGS. 6A-6B are a flowchart illustrating an example of a trusted login method, according to an implementation of the present disclosure.
Figure 6B:
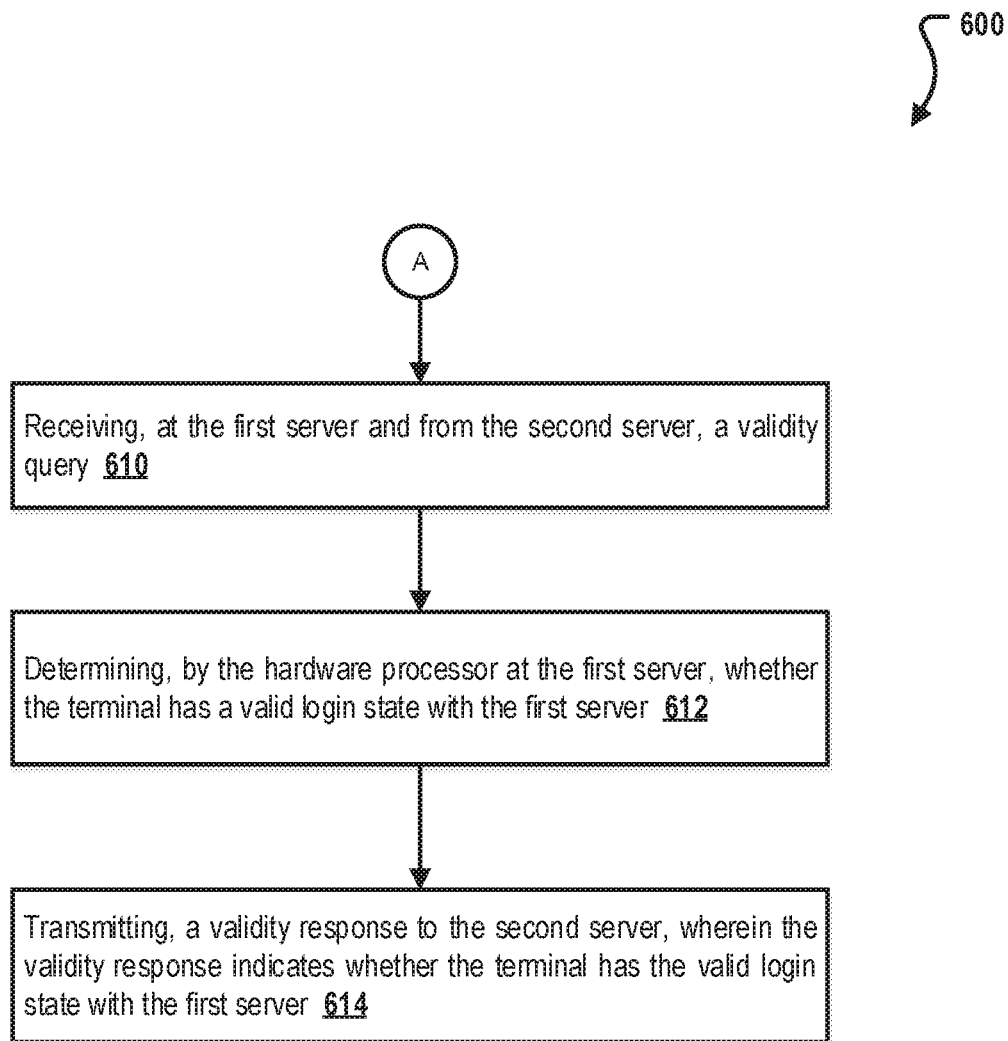

FIGS. 6A-6B are a flowchart illustrating an example of a trusted login method 600, according to an implementation of the present disclosure. For clarity of presentation, the description that follows generally describes method 600 in the context of the other figures in this description. Method 600 can be performed by a first server that provides a login state and device identifier information to a second server, for example, the first server 154 described previously. However, it will be understood that method 600 can be performed, for example, by any system, environment, software, and hardware, or a combination of systems, environments, software, and hardware, as appropriate. In some implementations, various steps of method 600 can be run in parallel, in combination, in loops, or in any order.

At 602, a first server that provides the first service receives a first login request for a first service from a terminal. From 602, method 600 proceeds to 604.

At 604, the first server generates device identifier information of the terminal. From 604, method 600 proceeds to 606.

At 606, the first server associates the device identifier information of the terminal with first login state information. The first login state information indicates that the terminal has logged into the first server. From 606, method 600 proceeds to 608.

At 608, the first server transmits the device identifier information and the first login state information to a second server. The second server provides a second service that has a trusted login relationship with the first service. In some implementations, from 608, method 600 proceeds to 610.

At 610, the first server receives a validity query from the second server. From 610, method 600 proceeds to 612.

At 612, the first server determines whether the terminal has a valid login state with the first server. From 612, method 600 proceeds to 614.

At 614, the first server transmits a validity response to the second server. The validity response indicates whether the terminal has the valid login state with the first server. After 614, method 600 stops.

Figure 7A:
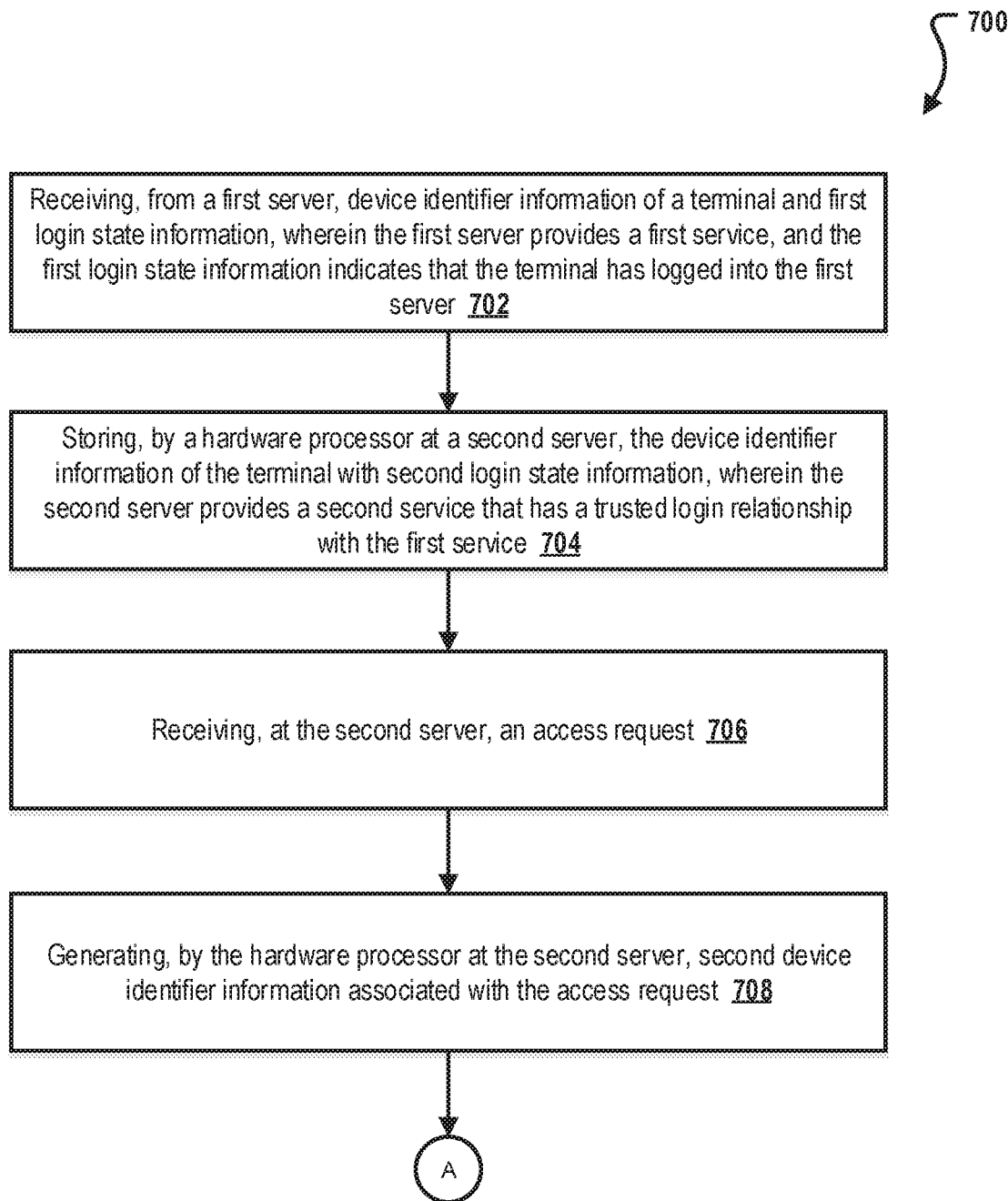
FIGS. 7A-7B are a flowchart illustrating another example of a trusted login method, according to an implementation of the present disclosure.
Figure 7B:
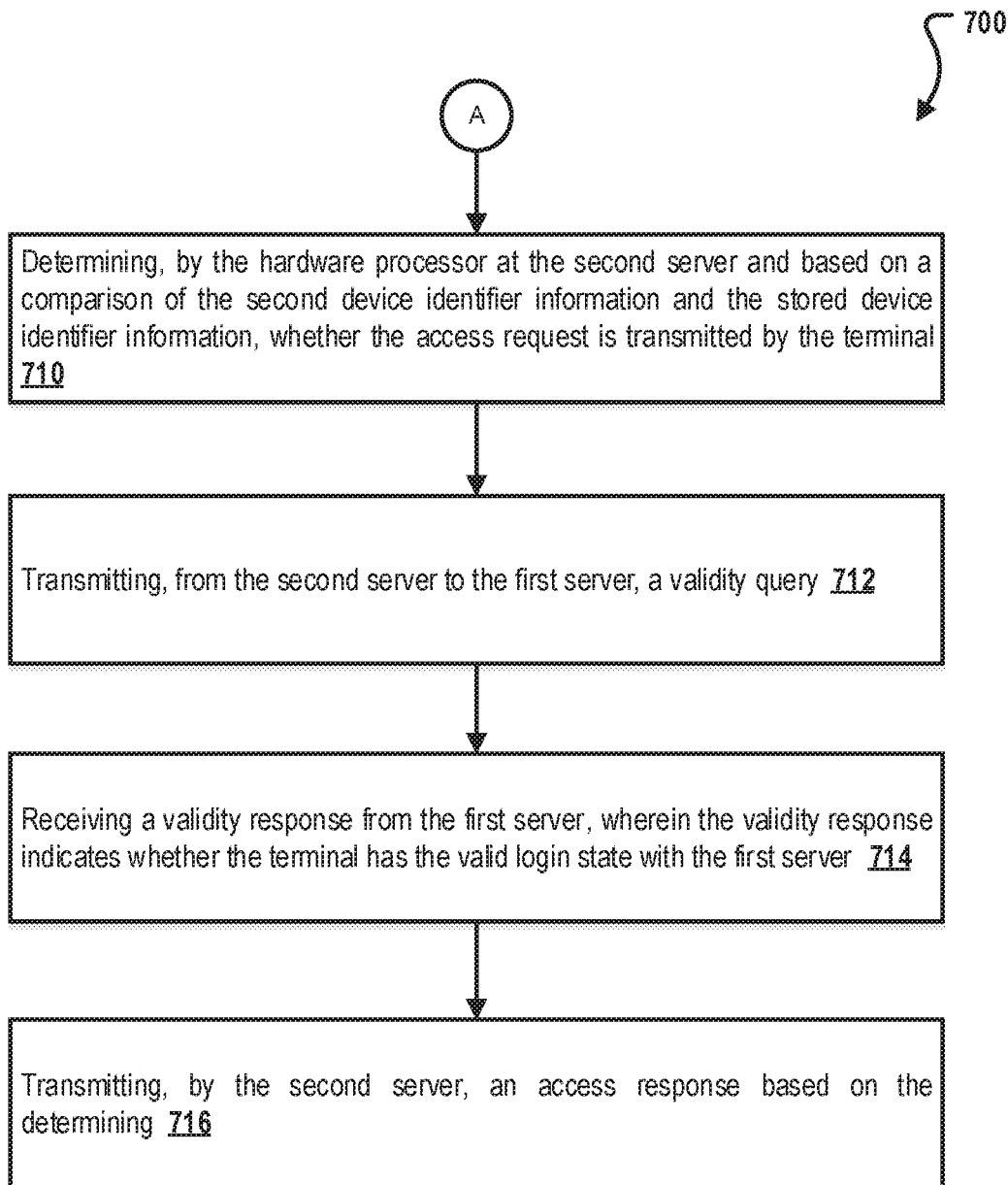

FIGS. 7A-7B are a flow chart illustrating another example of a trusted login method 700, according to an implementation of the present disclosure. For clarity of presentation, the description that follows generally describes method 700 in the context of the other figures in this description. Method 700 can be performed by a second server that receives a login state and device identifier information from a first server, for example, the second server 156 described previously. However, it will be understood that method 700 can be performed, for example, by any system, environment, software, and hardware, or a combination of systems, environments, software, and hardware, as appropriate. In some implementations, various steps of method 700 can be run in parallel, in combination, in loops, or in any order.

At 702, device identifier information of a terminal and first login state information are received from a first server that provides a first service. The first login state information indicates that the terminal has logged into the first server. From 702, method 700 proceeds to 704.

At 704, a second server stores the device identifier information of the terminal with second login state information. The second server provides a second service that has a trusted login relationship with the first service. From 704, method 700 proceeds to 706.

At 706, the second server receives an access request. From 706, method 700 proceeds to 708.

At 708, the second server generates second device identifier information associated with the access request. From 708, method 700 proceeds to 710.

At 710, the second server determines, based on a comparison of the second device identifier information and the stored device identifier information, whether the access request is transmitted by the terminal. From 710, method 700 proceeds to 712.

At 712, the second server transmits a validity query to the first server. From 712, method 700 proceeds to 714.

At 714, the second server receives a validity response to the second server. The validity response indicates whether the terminal has the valid login state with the first server. From 714, method 700 proceeds to 716.

At 716, the second server transmits an access response based on the determining. In some cases, the access response is further based on the validity response. After 716, method 700 stops.

Described implementations of the subject matter can include one or more features, alone or in combination.

For example, in a first implementation, a computer-implemented method for a trusted login procedure comprises: receiving, at a first server that provides a first service and from a terminal, a first login request for the first service; generating, by a hardware processor at the first server, device identifier information of the terminal; associating, by the hardware processor at the first server, the device identifier information of the terminal with first login state information, wherein the first login state information indicates that the terminal has logged into the first server; and transmitting, to a second server, the device identifier information and the first login state information, wherein the second server provides a second service that has a trusted login relationship with the first service.

The foregoing and other described implementations can each, optionally, include one or more of the following features:

A first feature, combinable with any of the following features, wherein the device identifier information is generated based on terminal information received from the terminal, and the terminal information includes at least one of terminal internal protocol (IP) address, terminal media access control (MAC) address, terminal subscriber identity module (SIM) card number, or terminal Universal Integrated Circuit Card (UICC) number.

A second feature, combinable with any of the previous or following features, wherein the device identifier information is calculated using an MD5 algorithm.

A third feature, combinable with any of the previous or following features, the method further comprising: receiving, at the first server and from the second server, a validity query; determining, by the hardware processor at the first server, whether the terminal has a valid login state with the first server; and transmitting a validity response to the second server, wherein the validity response indicates whether the terminal has the valid login state with the first server.

A fourth feature, combinable with any of the previous or following features, wherein the device identifier information and the first login state information is sent to the second server in response to a redirect operation.

A fifth feature, combinable with any of the previous or following features, wherein the first login state information includes user information associated with the first login request.

In a second implementation, a computer-implemented method for a trusted login procedure, comprising: receiving, from a first server, device identifier information of a terminal and first login state information, wherein the first server provides a first service, and the first login state information indicates that the terminal has logged into the first server; storing, by a hardware processor at a second server, the device identifier information of the terminal with second login state information, wherein the second server provides a second service that has a trusted login relationship with the first service; receiving, at the second server, an access request; generating, by the hardware processor at the second server, second device identifier information associated with the access request; determining, by the hardware processor at the second server and based on a comparison of the second device identifier information and the stored device identifier information, whether the access request is transmitted by the terminal; transmitting, by the second server, an access response based on the determining.

The foregoing and other described implementations can each, optionally, include one or more of the following features:

A first feature, combinable with any of the following features, wherein the access request is determined to be transmitted by the terminal, and the access response indicates that access is granted.

A second feature, combinable with any of the previous or following features, wherein the access request is determined not to be transmitted by the terminal, and the access response indicates that access is not granted.

A third feature, combinable with any of the previous or following features, the method further comprising: transmitting, from the second server to the first server, a validity query; receiving a validity response from the first server, wherein the validity response indicates whether the terminal has a valid login state with the first server; and wherein the access response is further based on the validity response.

In a third implementation, a non-transitory computer-readable medium storing instructions which, when executed, cause a computer to perform operations comprising: receiving, at a first server that provides a first service and from a terminal, a first login request for the first service; generating, by a hardware processor at the first server, device identifier information of the terminal; associating, by the hardware processor at the first server, the device identifier information of the terminal with first login state information, wherein the first login state information indicates that the terminal has logged into the first server; and transmitting, to a second server, the device identifier information and the first login state information, wherein the second server provides a second service that has a trusted login relationship with the first service The foregoing and other described implementations can each, optionally, include one or more of the following features:

A first feature, combinable with any of the following features, wherein the device identifier information is generated based on terminal information received from the terminal, and the terminal information includes at least one of terminal internal protocol (IP) address, terminal media access control (MAC) address, terminal subscriber identity module (SIM) card number, or terminal Universal Integrated Circuit Card (UICC) number.

A second feature, combinable with any of the previous or following features, wherein the device identifier information is calculated using an MD5 algorithm.

A third feature, combinable with any of the previous or following features, the operations further comprising: receiving, at the first server and from the second server, a validity query; determining, by the hardware processor at the first server, whether the terminal has a valid login state with the first server; and transmitting a validity response to the second server, wherein the validity response indicates whether the terminal has the valid login state with the first server.

A fourth feature, combinable with any of the previous or following features, wherein the device identifier information and the first login state information is sent to the second server in response to a redirect operation.

A fifth feature, combinable with any of the previous or following features, wherein the first login state information includes user information associated with the first login request.

In a fourth implementation, a first server, comprising: a hardware processor; and a non-transitory computer-readable storage medium coupled to the hardware processor and storing programming instructions for execution by the hardware processor, wherein the programming instructions, when executed, cause the hardware processor to perform operations comprising: receiving, at the first server that provides a first service and from a terminal, a first login request for the first service; generating, by the hardware processor at the first server, device identifier information of the terminal; associating, by the hardware processor at the first server, the device identifier information of the terminal with first login state information, wherein the first login state information indicates that the terminal has logged into the first server; and transmitting, to a second server, the device identifier information and the first login state information, wherein the second server provides a second service that has a trusted login relationship with the first service.

The foregoing and other described implementations can each, optionally, include one or more of the following features:

A first feature, combinable with any of the following features, wherein the device identifier information is generated based on terminal information received from the terminal, and the terminal information includes at least one of terminal internal protocol (IP) address, terminal media access control (MAC) address, terminal subscriber identity module (SIM) card number, or terminal Universal Integrated Circuit Card (UICC) number.

A second feature, combinable with any of the previous or following features, wherein the device identifier information is calculated using an MD5 algorithm.

A third feature, combinable with any of the previous or following features, the operations further comprising: receiving, at the first server and from the second server, a validity query; determining, by the hardware processor at the first server, whether the terminal has a valid login state with the first server; and transmitting a validity response to the second server, wherein the validity response indicates whether the terminal has the valid login state with the first server.

A fourth feature, combinable with any of the previous or following features, wherein the device identifier information and the first login state information is sent to the second server in response to a redirect operation.

A fifth feature, combinable with any of the previous or following features, wherein the first login state information includes user information associated with the first login request.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital video disc (DVD), CD-ROM, DVD+/−R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components.

The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what can be claimed, but rather as descriptions of features that can be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method for a trusted login procedure, comprising:
 receiving, from a terminal and at a first server that provides a first service, a first login request for the first service;
 generating, by the first server, device identifier information of the terminal;
 associating, by the first server, the device identifier information of the terminal with first login state information, wherein the first login state information indicates that the terminal was verified and has logged into the first server successfully;
 transmitting, by the first server and to a second server, the device identifier information and the first login state information, wherein the device identifier information and the first login state information is transmitted to the second server in response to a redirect operation, wherein the second server provides a second service that has a trusted login relationship with the first service, wherein the second server establishes second login state information for the second service based on the first login state information, and wherein the second server associates the device identifier information of the terminal with the second login state information;
 recording, by the first server, that the first login state information has been shared with the second server by associating an identifier of the second server with the first login state information;
 receiving, by the second server from a device, an application access request for the second service;
 determining, by the second server, that an identifier information of the device sending the application access request matches the device identifier information of the terminal associated with the second login state information; and
 in response, returning, by the second server, an application access response to the terminal.

2. The method of claim 1, wherein the device identifier information is generated based on terminal information received from the terminal, and the terminal information includes at least one of terminal internal protocol (IP) address, terminal media access control (MAC) address, terminal subscriber identity module (SIM) card number, or terminal Universal Integrated Circuit Card (UICC) number.

3. The method of claim 1, wherein the device identifier information is calculated using an MD5 algorithm.

4. The method of claim 1, further comprising:
 receiving, at the first server and from the second server, a validity query;
 determining, by the first server, whether the terminal has a valid login state with the first server; and
 transmitting, by the first server, a validity response to the second server, wherein the validity response indicates whether the terminal has the valid login state with the first server.

5. The method of claim 1, wherein the first login state information includes user information associated with the first login request.

6. A non-transitory, computer-readable medium storing one or more instructions executable by a computer system to perform operations comprising:
 receiving, from a terminal and at a first server that provides a first service, a first login request for the first service;
 generating, by the first server, device identifier information of the terminal;
 associating, by the first server, the device identifier information of the terminal with first login state information, wherein the first login state information indicates that the terminal was verified and has logged into the first server successfully;
 transmitting, by the first server and to a second server, the device identifier information and the first login state information, wherein the device identifier information and the first login state information is transmitted to the second server in response to are direct operation, wherein the second server provides a second service that has a trusted login relationship with the first service, wherein the second server establishes second login state information for the second service based on the first login state information, and wherein the second server associates the device identifier information of the terminal with the second login state information;
 recording, by the first server, that the first login state information has been shared with the second server by associating an identifier of the second server with the first login state information;
 receiving, by the second server from a device, an application access request for the second service;
 determining, by the second server, that an identifier information of the device sending the application access request matches the device identifier information of the terminal associated with the second login state information; and
 in response, returning, by the second server, an application access response to the terminal.

7. The non-transitory, computer-readable medium of claim 6, wherein the device identifier information is generated based on terminal information received from the terminal, and the terminal information includes at least one of terminal internal protocol (IP) address, terminal media access control (MAC) address, terminal subscriber identity module (SIM) card number, or terminal Universal Integrated Circuit Card (UICC) number.

8. The non-transitory, computer-readable medium of claim 6, wherein the device identifier information is calculated using an MD5 algorithm.

9. The non-transitory, computer-readable medium of claim 6, the operations further comprise:
 receiving, at the first server and from the second server, a validity query;
 determining, by the first server, whether the terminal has a valid login state with the first server; and
 transmitting, by the first server, a validity response to the second server, wherein the validity response indicates whether the terminal has the valid login state with the first server.

10. The non-transitory, computer-readable medium of claim 6, wherein the first login state information includes user information associated with the first login request.

11. A computer-implemented system, comprising:
 one or more computers; and one or more computer memory devices interoperably coupled with the one or more computers and having tangible, non-transitory, machine-readable media storing one or more instructions that, when executed by the one or more computers, perform one or more operations comprising:

receiving, from a terminal and at a first server that provides a first service, a first login request for the first service;

generating, by the first server, device identifier information of the terminal;

associating, by the first server, the device identifier information of the terminal with first login state information, wherein the first login state information indicates that the terminal was verified and has logged into the first server successfully;

transmitting, by the first server and to a second server, the device identifier information and the first login state information, wherein the device identifier information and the first login state information is transmitted to the second server in response to are direct operation, wherein the second server provides a second service that has a trusted login relationship with the first service, wherein the second server establishes second login state information for the second service based on the first login state information, and wherein the second server associates the device identifier information of the terminal with the second login state information;

recording, by the first server, that the first login state information has been shared with the second server by associating an identifier of the second server with the first login state information;

receiving, by the second server from a device, an application access request for the second service;

determining, by the second server, that an identifier information of the device sending the application access request matches the device identifier information of the terminal associated with the second login state information; and in response, returning, by the second server, an application access response to the terminal.

12. The computer-implemented system of claim 11, wherein the device identifier information is generated based on terminal information received from the terminal, and the terminal information includes at least one of terminal internal protocol (IP) address, terminal media access control (MAC) address, terminal subscriber identity module (SIM) card number, or terminal Universal Integrated Circuit Card (UICC) number.

13. The computer-implemented system of claim 11, wherein the device identifier information is calculated using an MD5 algorithm.

14. The computer-implemented system of claim 11, the operations further comprise:

receiving, at the first server and from the second server, a validity query;

determining, by the first server, whether the terminal has a valid login state with the first server; and transmitting, by the first server, a validity response to the second server, wherein the validity response indicates whether the terminal has the valid login state with the first server.

15. The computer-implemented system of claim 11, wherein the first login state information includes user information associated with the first login request.

* * * * *

UNITED STATES PATENT AND TRADEMARK OFFICE
CERTIFICATE OF CORRECTION

PATENT NO. : 10,917,397 B2
APPLICATION NO. : 16/884966
DATED : February 9, 2021
INVENTOR(S) : Zhizhang Zhou Page 1 of 1

It is certified that error appears in the above-identified patent and that said Letters Patent is hereby corrected as shown below:

In the Claims

Column 20, Line 21, in Claim 6, delete "are direct" and insert -- a redirect --, therefor.

Column 21, Line 22, in Claim 11, delete "are direct" and insert -- a redirect --, therefor.

Signed and Sealed this
Twentieth Day of April, 2021

Drew Hirshfeld
*Performing the Functions and Duties of the
Under Secretary of Commerce for Intellectual Property and
Director of the United States Patent and Trademark Office*